US012444803B2

(12) United States Patent
Cook et al.

(10) Patent No.: US 12,444,803 B2
(45) Date of Patent: Oct. 14, 2025

(54) BATTERY ENCLOSURE FASTENER

(71) Applicant: Dana Automotive Systems Group, LLC, Maumee, OH (US)

(72) Inventors: Christopher M. Cook, McKenzie, TN (US); Michael Kevin Nanney, Paris, TN (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 754 days.

(21) Appl. No.: 17/652,450

(22) Filed: Feb. 24, 2022

(65) Prior Publication Data

US 2022/0302547 A1  Sep. 22, 2022

Related U.S. Application Data

(60) Provisional application No. 63/163,377, filed on Mar. 19, 2021.

(51) Int. Cl.
*H01M 50/262* (2021.01)
*H01M 50/24* (2021.01)
*H01M 50/244* (2021.01)
*H01M 50/249* (2021.01)

(52) U.S. Cl.
CPC ......... *H01M 50/262* (2021.01); *H01M 50/24* (2021.01); *H01M 50/244* (2021.01); *H01M 50/249* (2021.01); *H01M 2220/20* (2013.01)

(58) Field of Classification Search
CPC ............. H01M 50/244; H01M 50/249; H01M 50/262; F16B 5/025
See application file for complete search history.

(56) References Cited

U.S. PATENT DOCUMENTS

| | | | |
|---|---|---|---|
| 2002/0076295 A1* | 6/2002 | Gibbons | F16B 31/021 411/1 |
| 2003/0185650 A1* | 10/2003 | Kirchen | F16B 13/124 411/432 |
| 2015/0322993 A1* | 11/2015 | Brewer | F16B 37/048 156/66 |
| 2019/0162217 A1* | 5/2019 | Vovan | F16B 19/1063 |
| 2021/0288299 A1* | 9/2021 | Ramadan | B60L 50/64 |
| 2021/0402863 A1* | 12/2021 | Huang | H01M 50/291 |

FOREIGN PATENT DOCUMENTS

| | | |
|---|---|---|
| DE | 102018211472 A1 * | 1/2020 |
| EP | 0207833 B1 | 1/1987 |

OTHER PUBLICATIONS

DE 102018211472 A1 translation (Year: 2020).*

* cited by examiner

*Primary Examiner* — Allison Bourke
*Assistant Examiner* — Travis L. Martin
(74) *Attorney, Agent, or Firm* — McCoy Russell LLP

(57) ABSTRACT

Methods and systems are provided for a fastener for a battery casing. In one example, the fastener may include a bolt inserted into a sleeve to align and secure parts of a battery casing. The sleeve may be a continuous, unitary structure that may be shaped as a dowel pin and may include a nut and torque limiter.

4 Claims, 4 Drawing Sheets

BATTERY ENCLOSURE FASTENER

CROSS REFERENCE TO RELATED APPLICATIONS

The present application claims priority to U.S. Provisional Application No. 63/163,377, entitled "BATTERY ENCLOSURE FASTENER", and filed on Mar. 19, 2021. The entire contents of the above-listed application are hereby incorporated by reference for all purposes.

TECHNICAL FIELD

The present description relates generally to methods and systems for a fastener for a battery enclosure.

BACKGROUND AND SUMMARY

A battery assembly, including a battery, may be installed in an automotive vehicle for assisting engine start and powering other vehicle systems. The battery may be enclosed in a cover to shield the battery from contact with external objects, provide a thermal barrier to inhibit heat conduction from the battery to surrounding components, and maintain the position of the battery relative to the vehicle. The battery casing thus provides a barrier between the battery and other objects and reduces a likelihood of combustion arising from overheating or puncture.

In some examples, such as an electric vehicle or a hybrid electric vehicle operating in an all-electric mode, propulsion and operation of other vehicle systems exclusively relies on electric power. The battery may be large to provide sufficient power to meet the vehicle's energy demands. A corresponding battery casing may be undesirably heavy, particularly if formed from a conventional material providing durability and rigidity, such as a metal. In order to address this issue, the battery casing may instead be formed from a composite material with similar mechanical properties (e.g., durability, tensile strength, etc.).

However, the inventors herein have recognized potential issues with composite battery casings. As one example, the composite material may have low ductility and may therefore be prone to cracking or deformation if stress is applied. For example, localized mechanical stress may be imposed on the battery casing during assembly of the battery casing when torque is applied to fasteners securing the battery casing. Because of this, control of torque applied to the fasteners is desirable, which may be enabled by implementing torque limiting devices, e.g., torque limiters. However, incorporation of the torque limiting devices may further add to a number of coupling devices used to fasten portions of the battery casing to one another, therefore increasing a complexity of the coupling devices. For example, securing of the battery casing may demand various fastening components such as nuts, bolts, washers, etc. Addition of further components to the coupling devices may become cumbersome and time consuming during onsite installation of the battery assembly. As such, shipping, organization, and assembly of the coupling devices for fastening the battery casing may lead to prolonged processing and increased costs.

In one example, the issues described above may be addressed by a fastening device for a battery enclosure, the fastening device including a bolt and a sleeve configured to engage the bolt and formed as a continuous, unitary structure, the sleeve including a nut aligned with a torque limiter along a central axis of the sleeve and wherein the sleeve is shaped as a dowel pin. In this way, the fastening device may reduce a number of individual components demanding assembly while allowing the battery enclosure to be secured with reduced stress.

As an example, the fastening device may be used to secure a first part of the battery enclosure, e.g., an upper part, to a second part of the battery enclosure, e.g., a bottom part. The nut of the sleeve may be arranged at one end of the sleeve and by inserting the bolt into the sleeve and engaging threads of the bolt with threads of the nut, the bolt may be secured to the sleeve thereby fastening the first and second parts of the battery enclosure to one another. The torque limiter of the sleeve may control an amount of torque applied to the bolt during tightening of the bolt, mitigating stress applied to the battery enclosure that may otherwise lead to cracking. By shaping the sleeve as the dowel pin, the sleeve may be installed in, for example, an opening in the first part of the battery enclosure to allow a corresponding opening in the second part of the battery enclosure to be aligned with the sleeve. Coupling of second part of the battery enclosure to the first part is thereby easily guided by the sleeve and readily secured by inserting the bolt into the sleeve. In this way, installation of a battery assembly, including the battery enclosure, may be simplified, thus reducing assembly time and manufacturing costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
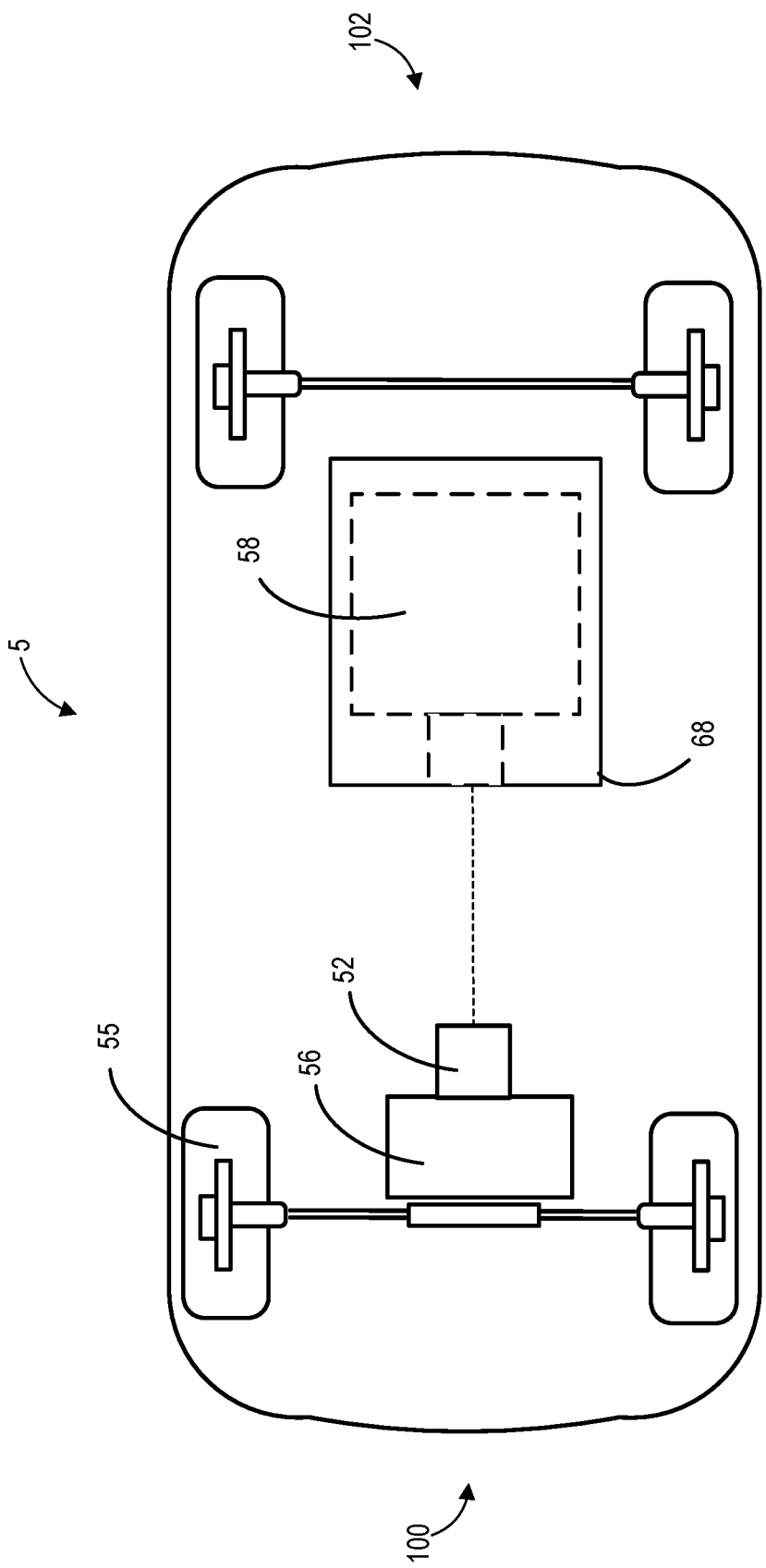
FIG. 1 shows an example of a vehicle which may include a battery as part of the vehicle powertrain.

The following description relates to systems and methods for a composite battery enclosure or casing and a fastener therefor. The battery casing may be implemented to secure and enclose a battery within a vehicle. For example, the vehicle may be a hybrid or all-electric vehicle, as shown in FIG. 1, and the battery may be configured to power an electric machine to provide torque to the vehicle wheels. The battery may be enclosed within the battery casing. An example of the battery casing, including the fastener, is shown from a top view in FIG. 2A and a bottom view in FIG. 2B. The fastener secures two portions of the battery casing to one another and includes a bolt and a sleeve, the sleeve configured to receive the bolt and having more than one component integrated into a single, continuous structure. A cross-section of a portion of the battery casing, including the fastener fastened thereto, is shown in FIG. 3. An example of a method for assembling the battery casing is shown in FIG. 4.

Turning now to FIG. 1, an example vehicle 5 is shown. In some examples, vehicle 5 may be a hybrid vehicle with multiple sources of torque available to one or more vehicle wheels 55. In other examples, vehicle 5 may be an all-electric vehicle, powered exclusively by an energy storage device such as a battery 58. In the example shown, vehicle 5 includes an electric machine 52 which may be a motor or a motor/generator. Electric machine 52 receives electrical power from the battery 58 which is converted to rotational energy, e.g., torque, at a transmission 56. The torque is delivered to vehicle wheels 55. Electric machine 52 may also be operated as a generator to provide electrical power to charge battery 58, for example, during a braking operation.

While electric machine 52 is shown providing rotational energy to the vehicle wheels 55 proximate to a front end 100 of vehicle 5, e.g., at front wheels of the vehicle, via the transmission 56, it will be appreciated that the transmission 56 may be alternatively arranged at rear wheels of vehicle 5, e.g., vehicle wheels 55 proximate to a rear end 102 of the vehicle, and energy from the electric machine 52 transmitted thereto. Furthermore, in other examples, each of the front wheels and the rear wheels may be coupled to individual transmissions, such as when vehicle 5 is configured with all-wheel drive.

In the depicted example, the battery 58 may be installed in a rear region of the vehicle, e.g., between the vehicle wheels 55 and closer to the rear end 102 of the vehicle 5 than the front end 100. In one example, the battery 58 may be positioned below rear passenger seats of the vehicle. In other examples, the battery 58 may be located in a floor of a rear compartment of the vehicle or may be integrated into a vehicle chassis. The battery 58 may be secured within a battery casing 68 formed of a rigid material, such as a composite, e.g., a polymer composite. The battery casing 68 may entirely enclose the battery 58, providing a barrier between the battery 58 and external components, and absorbing vibrations from the vehicle that would otherwise be imparted to the battery 58. In order to install the battery 58 within the battery casing 68, the casing may consist of two parts that are assembled around the battery and secured to one another. A fastening device, or fastener 206, is shown in FIG. 2A-3 which may be used to couple the two parts of the battery casing 68.

Figure 2B:
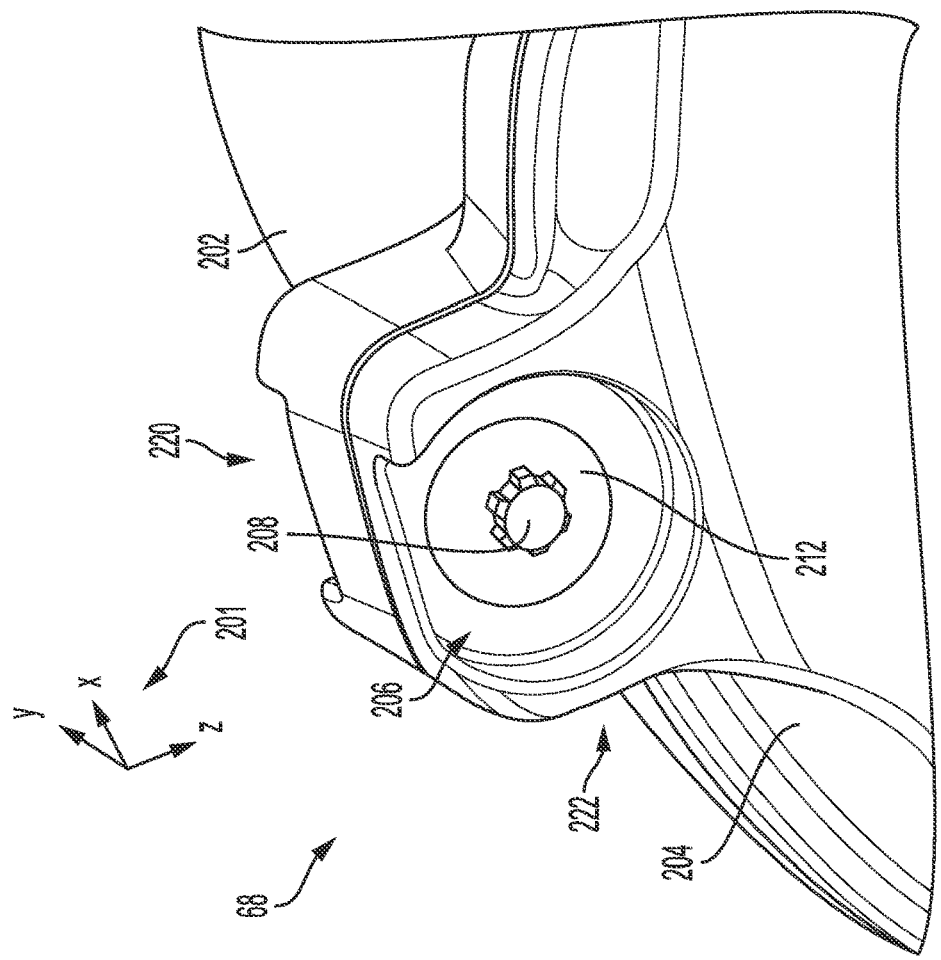
FIG. 2B shows a bottom isometric view of the battery casing and fastener of FIG. 2A.
Figure 2A:
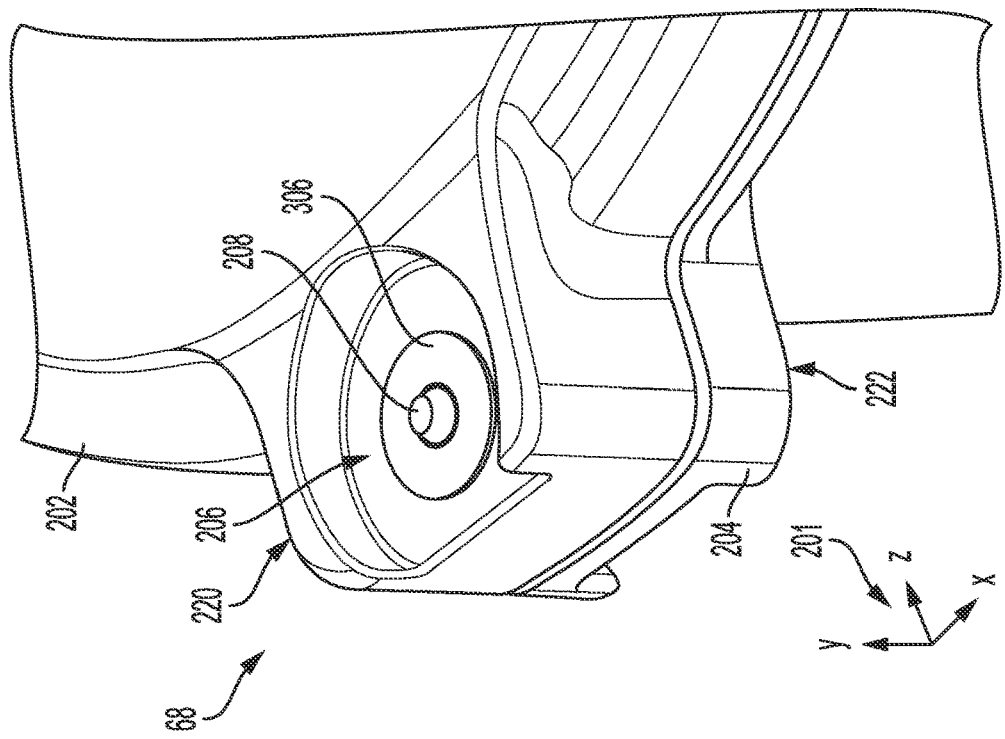
FIG. 2A shows a top isometric view of a battery casing held together by a fastener.
Figure 3:
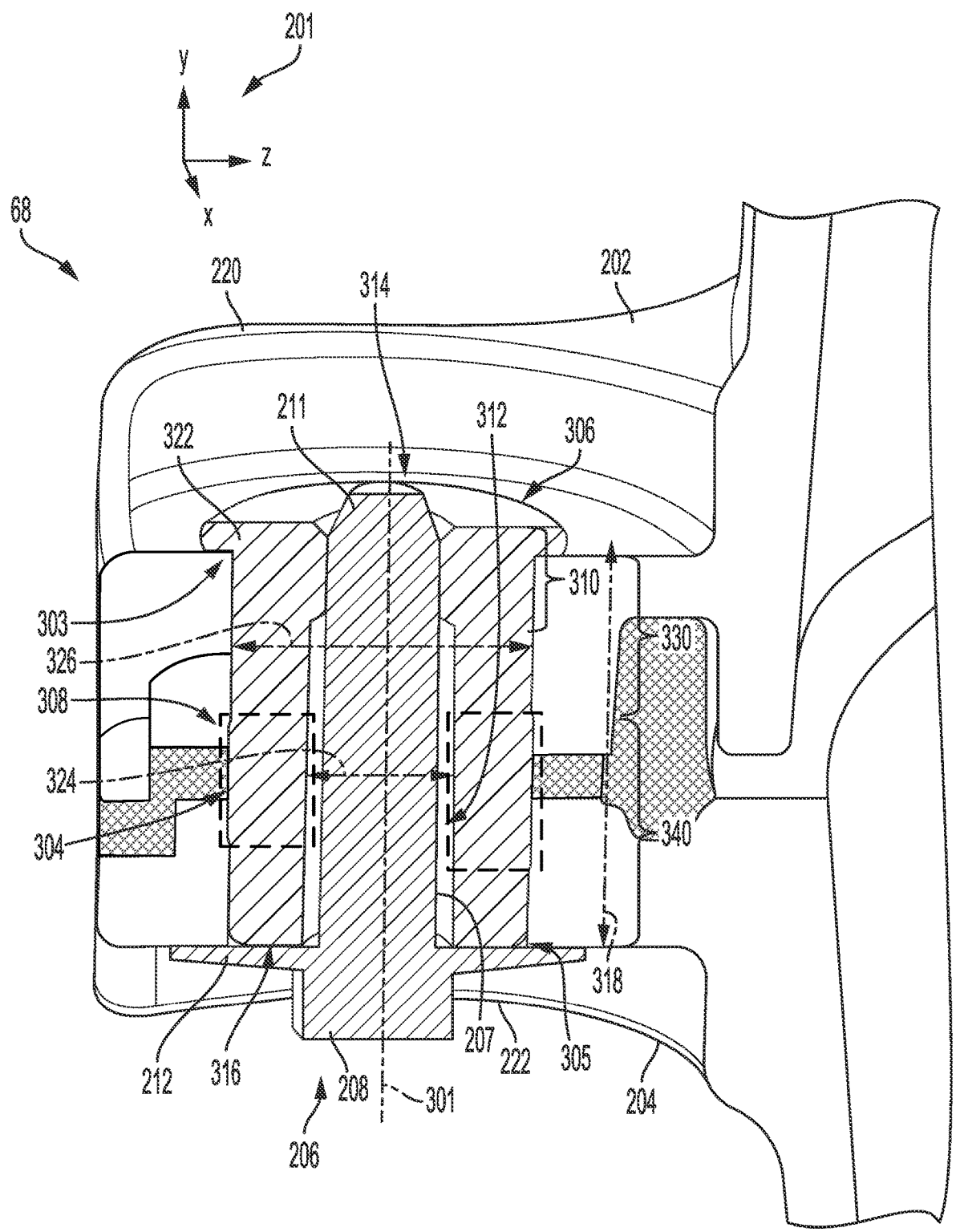
FIG. 3 shows a detailed cross-sectional view of the fastener shown in FIGS. 2A and 2B.
Figure 4:
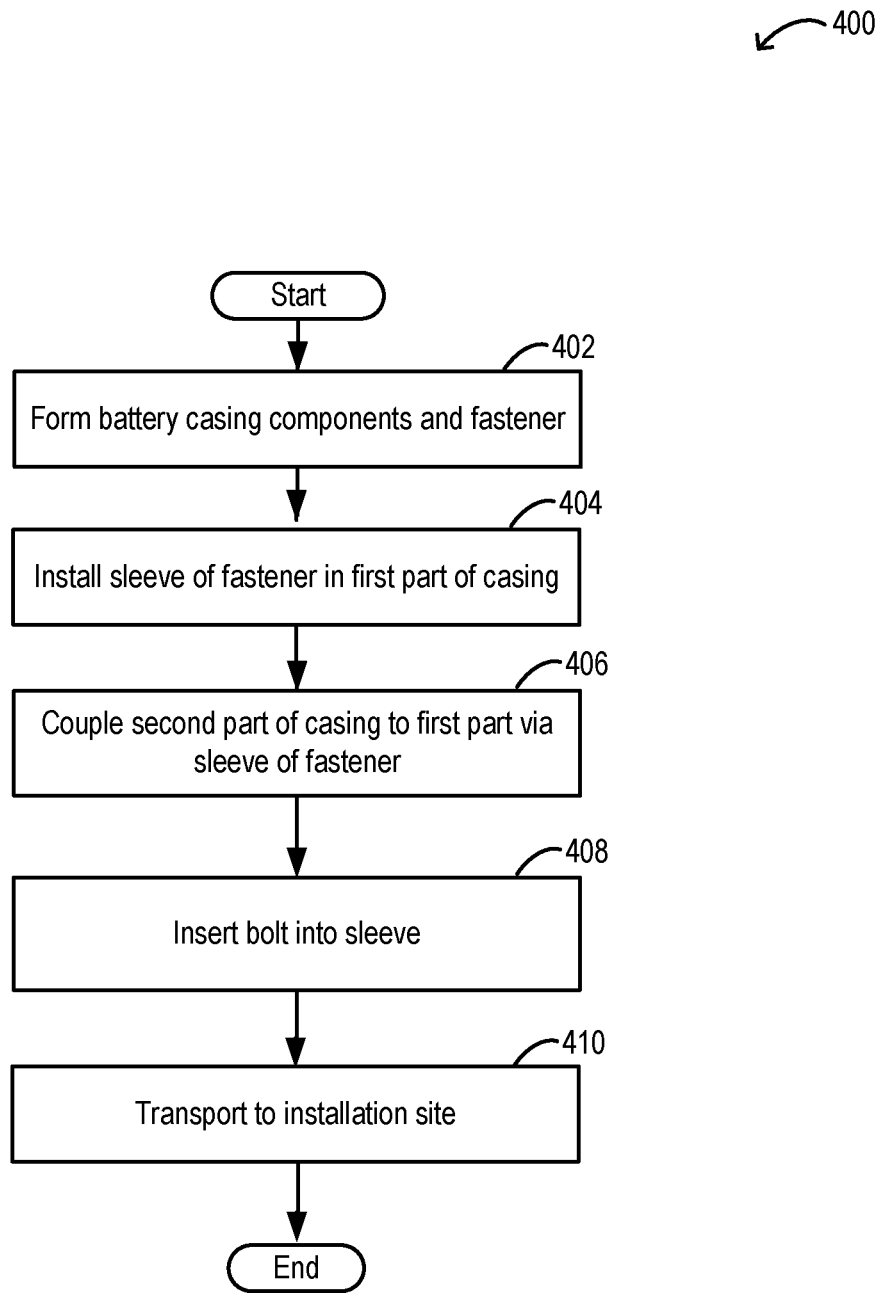
FIG. 4 shows a flow chart illustrating a method for assembling the battery casing.

FIGS. 2A and 2B show a first, top isometric view and a second, bottom isometric view, respectively, of a portion of the battery casing 68 configured to receive the fastener 206 and FIG. 3 shows a cross-sectional view of the fastener 206 inserted into the battery casing 68. A set of reference axes 201 are provided for comparison between the views shown, indicating a y-axis, and x-axis, and a z-axis. As such, a cross-section of FIG. 3 is taken along the y-z plane. The battery casing 68 may have two parts, including a top casing 202 and a bottom casing 204 that are joined together by the fastener 206. When the top casing 202 and the bottom casing 204 are assembled, the battery casing 68 completely encloses and secures a battery, such as the battery 58 of FIG. 1, within an inner cavity of the battery casing 68.

In the example shown the top casing 202 has a first protrusion 220 and the bottom casing has a second protrusion 222, each of the protrusions extending outwards and away from the battery casing 68 along the x-z plane, e.g., away from a central region of the battery casing 68, along a perimeter of the battery casing 68. The protrusions are each continuous with the top and bottom casings of the battery casing 68, e.g., the first protrusion 220 is integrated into a material of the top casing 202 and the second protrusion 222 is integrated into a material of the bottom casing 204. For example, the battery casing 68 may be molded with the protrusions during fabrication. A geometry of the first protrusion 220 matches a geometry of the second protrusion 222, e.g., widths (defined along the x-axis) and lengths (defined along the z-axis) of the protrusions are similar. The first protrusion 220 includes a first opening 303 and the second protrusion 222 includes a second opening 304 and a third opening 305, as indicated in FIG. 3, which are aligned along the y-axis when the top casing 202 and the bottom casing 204 are coupled.

In the example shown, the fastener 206 includes a bolt 208 and a sleeve 306, as shown in FIGS. 2A and 3. The sleeve 306 is a single continuous cylindrical unit, configured to receive the bolt 208, with a relatively uniform outer diameter 326, as indicated in FIG. 3. The outer diameter 326 may include small variations, however, described further below. The sleeve 306 includes a torque limiter 308 (as indicated by dashed rectangles) and a nut 310, where the torque limiter 308 and the nut 310 may both be incorporated, e.g., integrated, into a structure of the sleeve 306, as shown in FIG. 3. The nut 310 may be positioned proximate to an end of the sleeve 306, e.g., a top end 314 of the sleeve 306, with respect to the y-axis. However, in other examples, the sleeve 306 may be arranged in an opposite orientation with the nut 310 instead at a bottom end of the sleeve 306.

An inner surface of the nut 310 of the sleeve 306 may include threading configured to engage with threading of the bolt 208. The threading of the bolt 208 may be arranged proximate to a tail end 211 of the bolt 208. The bolt 208 may be inserted through a bore 312 of the sleeve 306, the bore 312 extending along an entire length 318 of the sleeve 306, and centered about a central axis of rotation 301 of the fastener 206. Furthermore, the bolt 208 may be inserted at a bottom end 316 of the sleeve 306, e.g., opposite of the top end 314 such that the tail end 211 of the bolt 208 is oriented upwards, with respect to the y-axis.

As shown in FIG. 3, an inner diameter 324 of the sleeve 306, e.g., a diameter 324 of the bore 312, may be uniform along a portion of the length 318 of the sleeve 306 and may be narrower at the nut 310. The diameter 324 of the bore 312 along the portion of the length 318 below (with respect to the y-axis) the nut 310 may be wider than the diameter of a shaft 207 of the bolt 208. In other words, the diameter 324 of the bore 312 at regions of the bore 312 distanced from the nut 310, and not at the nut 310, may be wider than the diameter 324 of the bore 312 at the nut 310. In one example, the nut 310 may form a portion of the length 318 of the sleeve 306 equal to 25% of the length 318. In other examples, the nut 310 may be anywhere between 20% to 50% of the length 318 of the sleeve 306. At the nut 310, the diameter of the bore 312 is similar to the diameter of the shaft 207 of the bolt 208, thereby enabling contact between the threading of the nut 310 and the threading of the bolt 208.

The bolt 208 may be tightened within the sleeve 306 by rotating the bolt 208 until the threading of the nut 310 and the threading of the bolt 208 are engaged to a maximum extent. As such, the tail end 211 of the bolt 208 may protrude from the top end 314 of the sleeve 306. The maximum engagement of the bolt 208 with the nut 310 may be determined by contact between a flanged head 212 of the bolt 208 and the bottom end 316 of the sleeve 306. In other words, as the bolt 208 is tightened, the flanged head 212, having a larger diameter than both the diameter 324 of the bore 312 and the outer diameter 326 of the sleeve 306, may abut the bottom end 316 of the sleeve 306, thus halting further insertion of the bolt 208 into the bore 312 of the sleeve. By using the bolt 208 with the flanged head 212, implementation of a separate washer is precluded, thereby reducing a number of parts included in the fastener 206. A length of the bolt 208, as defined along the y-axis, may therefore be longer than the length 318 of the sleeve 306.

The length 318 of the sleeve 306 may be similar to a distance between an outer surface of the top casing 202 at the first protrusion 220 and an outer surface of the bottom casing 204 at the second protrusion 222. The sleeve 306 is shaped as a dowel pin such that, in addition to engaging with the bolt 208 via the nut 310 and controlling an amount of force applied to the battery casing 68 (due to tightening of the bolt 208) via the torque limiter, the sleeve 306 may also guide alignment of the top casing 202 with the bottom casing 204. For example, the top casing 202 and the bottom casing 204 may be separated and the sleeve 306 of the fastener 206 may be installed, e.g., inserted through, the first opening 303 of the first protrusion 220 of the top casing 202. The sleeve 306 may be pushed through the first opening 303 until a lip 322 of the sleeve 306 at the top end 314, the lip 322 extending away from and perpendicular to the central axis of rotation 301, abuts the outer surface of the top casing 202. The lip 322, having a larger diameter than the first opening 303, blocks further insertion of the sleeve 306 through the first opening 303.

Protrusion of the sleeve 306 from the first opening 303, in a downwards direction with respect to the y-axis, allows the sleeve 306 to guide an alignment of the second and third openings 304, 305 of the second protrusion 222 of the bottom casing 204 with the first opening 303 of the first protrusion 220 of the top casing 202. The sleeve 306 may be inserted through the second and third openings 304, 305, allowing edges of the top casing 202 to come into contact with edges of the bottom casing 204, e.g., the top and bottom casings are in edge-sharing contact. By inserting the bolt 208 through the bore 312 of the sleeve 306 and tightening the bolt 208, the top and bottom casings may be secured to one another.

It will be noted that the above description of installation of the fastener 206 is a non-limiting example. In other examples, the fastener 206 may be installed in an opposite orientation, e.g., the sleeve 306 may be inserted upwards, through the openings of the bottom casing 204 and the bolt 208 inserted downwards into the sleeve 306.

In some examples, to increase friction between an outer surface of the sleeve 306 and inner surfaces of the openings of the battery casing 68, the outer surface of the sleeve may be modified. For example, the outer surface may include ridges or some other type of texturing to increase a roughness of the outer surface of the sleeve 306. Additionally, the outer diameter 326 of the sleeve 306 may be similar to diameters of the openings and may therefore create a tight fit within the openings. In particular, the outer diameter 326 of the sleeve 306 may be wider at a region in contact with one or more of the second opening 304 and the third opening 305 of the second protrusion 222 of the bottom casing 204, resulting in a tighter fit between the sleeve 306 and the second and third openings 304, 305 that does not allow the sleeve 306 to rotate within the openings. However, the fit between the first opening 303 of the first protrusion 220 of the top casing 202 and the sleeve 306 may be looser, allowing spinning of the sleeve within the first opening 303.

The torque limiter 308 of the sleeve 306 may be arranged at a midpoint along the length 318 of the sleeve 306, at the second opening 304 of the second protrusion 222 of the bottom casing 204. For example, the midpoint may be halfway along the length 318 of the sleeve 306 or may be biased be closer to one end of the sleeve 306. The torque limiter 308 may be aligned with the nut 310 along the central axis of rotation 301. In one example, the torque limiter 308 may divide the sleeve 306 into a first section 330 and a second section 340, which are continuous with one another. The first section 330 may be an upper section including the nut 310 and the second section 340 may be a lower section proximate to the flanged head 212 of the bolt 208.

The first section 330 and the second section 340 may be configured to have different physical characteristics. In one example, a resistance of the first section 330 to shearing and deformation may be less than the second section 340. The reduced resistance of the first section 330 may be achieved by adjusting a thickness, e.g., a difference between the outer diameter 326 and the inner diameter 324, of the sleeve 306 at the first section 330. The different thicknesses of the first section 330 and the second section 340 may merge and transition at the torque limiter 308. As another example, the first section 330 may become more prone to shearing and/or deforming by removing an amount of material of the first section 330. For example, the first section 330 may include slots, thereby weakening a structural strength of the sleeve 306 at the first section 330.

When the bolt 208 is inserted into the sleeve 306 and tightened with a tool, e.g., a wrench, a stationary position of the sleeve 306 (e.g., spinning of the sleeve 306 is inhibited) is maintained by the tight fit between the second section 340 of the sleeve 306 and at least one of the second and third openings of the second protrusion 222 of the bottom casing 204. The battery casing 68 may be compressed between the flanged head 212 of the bolt 208 and the lip 322 of the sleeve 306 of the fastener 206 as the bolt 208 is rotated and tightened. Without incorporation of the torque limiter 308, if an amount of torque applied to the bolt 208 surpasses a threshold amount of torque, a resulting compression of the battery casing 68 in a region in contact with and surrounding the fastener 206 may cause the battery casing 68 to deform. In some instances, the battery casing 68 may rupture, e.g., and crack, degrading an integrity of the battery casing 68. Repair or replacement of the battery casing 68 may be costly.

By implementing the torque limiter 308 into the fastener 206, the torque limiter 308 may be configured to absorb the amount of torque beyond the threshold amount by deforming and, in some examples, shearing such that the first section 330 becomes detached from the second section 340. In conventional fasteners with torque limiters, the torque limiter may be disposed in a bolt, e.g., a torque-limiting bolt is used, where a head of the bolt is adapted to deform and shear, thus inhibiting further tightening of the bolt. The torque limiter 308 herein, however, is instead disposed in the sleeve. When the applied torque exceeds the threshold amount and the torque limiter 308 deforms and/or shears, continue rotation of the bolt 208 does not continue to tighten the bolt. The first section 330 of the sleeve may still be engaged with the bolt 208, e.g., at the threading, but the bolt 208 and the first section 330 may spin in unison, freely within the first opening 303 of the top casing 202 and independent of the second section 340. Continued tightening of the bolt 208 and compression of the battery casing 68 is thus circumvented. Furthermore, by arranging the torque limiter 308 in the sleeve 306 rather than the bolt 208, the flanged head bolt 208 may be used which precludes a demand for a separate washer.

It will be appreciated that while one fastener is shown as described here, the battery casing may include several sets of protrusions arranged around the perimeter of the battery casing (e.g., where a set of protrusions includes the protrusion of the top casing and the protrusion of the bottom casing), each set of protrusions configured to receive the fastener 206. For example, each side of the battery casing may include at least one set of protrusions. In other examples, the battery casing may include two sets of oppositely arranged protrusions, each secured by one fastener. In other examples, the battery casing 68 may be held together by a single larger protrusion including multiple fasteners.

As described above, the sleeve 306 is formed as a single continuous unit such that the nut 310 and the torque limiter 308 are integrated into the sleeve 306. For example, the sleeve 306 does not include any seams or joints dividing the nut 310 or the torque limiter 308 from surrounding regions of the sleeve 306. In one example, the sleeve 306 may be formed from a durable, rigid material, such as stainless steel, aluminum, brass, etc., where a strength of the material may be varied between the first section 330 and the second section 340 of the sleeve 306 as described above. The sleeve 306 may be fabricated by techniques such as die casting, machining, cold forging, cutting, etc. In some examples, the sleeve 306 may be additively manufactured.

In this way, a fastener for a composite battery casing or enclosure may be formed of a reduced number of parts. As shown in FIGS. 2A-3, the fastener may have two components: a flanged head bolt and a sleeve. The sleeve may be formed as a single, continuous unit and may incorporate a nut to engage the bolt and a torque limiter to control an amount of force exerted on the battery enclosure during tightening of the fastener. A shape of the sleeve may further enable the sleeve to be a dowel pin, providing a guide for aligning two parts of the battery enclosure to one another prior to insertion of the bolt into the sleeve. By integrating the nut and torque limiter into the sleeve, and shaping the sleeve as the dowel pin, the flanged head bolt may be used instead of a conventional torque-limiting bolt with a washer. As such, assembly of the battery enclosure may be simplified and streamlined, as described below with reference to FIG. 4, reducing an amount of time demanded to assemble the battery enclosure components, e.g., the two parts of the enclosure and one or more of the fastener(s). In addition, as the battery enclosure may be assembled and transported to another site for installation of a battery to form a battery assembly followed by installation of the battery assembly in a vehicle, a simplicity of the fastener may allow the parts of the battery enclosure to be easily secured to one another during transport. As such, all components for complete installation of the battery assembly may be available upon arrival of the battery enclosure at the installation site.

A method 400 for assembling a battery casing is shown in FIG. 4. The battery casing may be the battery casing 68 of FIGS. 1-3, where the battery casing has a first part, e.g., section or portion, configured to be in edge-sharing contact with a second part, e.g., section or portion, of the battery casing, where the first part and the second part form a complete outer shell for a battery when the battery casing is assembled by coupling the first and second parts to one another. The assembly of the battery casing may be performed in preparation for shipping of the battery casing to an installation site where the battery may be placed within the battery casing to form a battery assembly. To enable fast and efficient assembly upon arrival at the installation site, the first and second parts may be coupled and secured to one another using at least one fastener, such as the fastener 206 shown in FIGS. 2A-3 prior to transport. By using the fastener, a number of fastening components may be reduced, thereby simplifying and expediting assembly.

At 402, components of the battery casing are formed. The first and second parts of the battery casing may be formed of a composite material and shaped via conventional composite manufacturing methods. The fastener may be formed from a metal and shaped via one or more of forging, die casting, machining, as well as various other methods for manufacturing fasteners. The fastener includes a bolt with a flanged head and a sleeve, as described above, where the sleeve is shaped as a dowel pin and incorporates an integrated nut and an integrated torque limiter. The bolt and the sleeve are formed as separate components. The sleeve of the fastener is installed in the first part of the battery casing at 404.

For example, the sleeve of the fastener may be inserted through an opening in the first part of the battery casing such that a lip at a top of the sleeve abuts an upper surface of the first part of the battery casing, as shown in FIG. 3. A length of the sleeve of the fastener is sufficiently long to extend through openings in the second part of the battery casing when the second part is coupled to the first part of the battery casing at 406. The length of the sleeve allows the openings in the second part to be easily aligned with the opening in the first part, as described above. By aligning the openings of the first and second parts, which are aligned along a vertical axis of the battery casing, the first part of the battery casing is aligned with the second part along the vertical axis.

At 408, the bolt of the fastener is inserted into a bore of the sleeve. Threading of the bolt engages with threading of the nut of the sleeve, allowing the bolt to secure the coupling of the first part to the second part of the battery casing. The bolt may be tightened enough to maintain the edge-sharing contact between the two halves of the battery casing without exerting additional torque on the bolt. In one example, the bolt may be hand-tightened. In another example, the bolt may be tightened using a tool, such as a wrench until a torque applied by the tool reaches a threshold torque. The threshold torque may be an amount of torque corresponding to a maximum amount of compressive force exerted by the fastener that the battery casing may withstand without cracking.

The torque limiter of the sleeve may divide the sleeve, along a central axis of rotation of the fastener, into a first section and a second section. During tightening of the wrench, if the amount of torque surpasses the threshold torque, the first section of the sleeve, which includes the nut, may deform and/or shear. In some instances, the first section may detach from the second section. The first section may spin in unison with the bolt if rotation of the bolt, e.g., attempts to continue tightening the bolt, continues. Disengagement of the first section from the second section inhibits further tightening of the bolt. Compression of the battery casing at a region surrounding the fastener is thereby controlled, circumventing application of force that may otherwise lead to degradation of the battery casing.

If deformation and/or shearing of the sleeve occurs, replacement of the sleeve of the fastener may be demanded. However, replacing the sleeve of the fastener, even if more than one of the fasteners demands replacement, may be less costly than replacing the battery casing if the battery casing become degraded.

The at least partially assembled battery casing, including the first and second parts coupled to one another and maintained in place by one or more of the fastener, may be transported offsite at 410. For example, the battery casing may be shipped to the installation site where a vehicle battery may be added to the battery casing to form a battery assembly which may be installed in a vehicle.

FIGS. 2A-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2A-3 are shown approximately to scale.

The disclosure also provides support for a fastener for a battery enclosure, the fastener comprising: a bolt, and a sleeve configured to engage the bolt and formed as a continuous, unitary structure, the sleeve including a nut aligned with a torque limiter along a central axis of the sleeve and wherein the sleeve is shaped as a dowel pin. In a first example of the system, the sleeve is cylindrical with a bore extending along the central axis of the sleeve and wherein the bolt is inserted into the bore. In a second example of the system, optionally including the first example, the nut is arranged at a first end of the sleeve and includes threads configured to mate with threads of the bolt. In a third example of the system, optionally including one or both of the first and second examples, a diameter of a first portion of the bore is narrower at the nut than a diameter of a second portion of the bore distanced from the nut and wherein the diameter of the second portion of the bore distanced from the nut is wider than a diameter of a shaft of the bolt. In a fourth example of the system, optionally including one or more or each of the first through third examples, the first end of the sleeve includes a lip extending outwards and away from the central axis of the sleeve. In a fifth example of the system, optionally including one or more or each of the first through fourth examples, the torque limiter is arranged at a mid-point along a length of the sleeve between a first end of the sleeve and a second, opposite end of the sleeve, the length parallel with the central axis, and wherein the torque limiter divides the sleeve in a first section and a second section, the first and second sections aligned along the central axis and continuous with one another. In a sixth example of the system, optionally including one or more or each of the first through fifth examples, the first section includes the nut and wherein the first section is configured to shear and detach from the second section when a torque applied to the bolt at least reaches a threshold amount of torque. In a seventh example of the system, optionally including one or more or each of the first through sixth examples, the first section is decreased in one or more of thickness and an amount of material relative to the second section of the sleeve, and wherein the first section is decreased in material when the first section is configured with slots.

The disclosure also provides support for a battery enclosure, comprising: a composite casing having a first part and a second part, the composite casing configured to enclose a battery when the first part and the second part are coupled, and a fastener arranged in corresponding openings of the first part and the second part of the composite casing, the fastener having a sleeve shaped as a dowel pin and formed as a single, continuous unit, wherein the sleeve includes threading to engage with a bolt at a first end of the sleeve and a torque limiter to control an amount of compressive force applied to the composite casing by the fastener. In a first example of the system, the corresponding openings of the first part and the second part of the composite casing includes a first opening arranged in a first protrusion of the first part and further includes a second opening and a third opening, the second and third openings arranged in a second protrusion of the second part, and wherein the first, second, and third openings are aligned along a vertical axis of the composite casing when the first part and the second part are coupled. In a second example of the system, optionally including the first example, the sleeve of the fastener extends from the first opening to the third opening and wherein a fit between the sleeve and the corresponding openings of the first and second parts of the composite casing is tighter at one or more of the second and third openings than at the first opening. In a third example of the system, optionally including one or both of the first and second examples, the fastener is arranged in the corresponding openings with the first end of the sleeve inserted through the first opening of the corresponding openings and a second end of the sleeve, opposite to the first end, inserted through the third opening of the corresponding openings. In a fourth example of the system, optionally including one or more or each of the first through third examples, the first end of the sleeve includes a lip extending outward and away from a central axis of rotation of the fastener, and wherein the lip is configured to abut an outer surface of the first part of the composite casing when the sleeve is inserted through the corresponding openings of the first part and the second part of the composite casing. In a fifth example of the system, optionally including one or more or each of the first through fourth examples, the torque limiter divides the sleeve into a first section extending from the first end of the sleeve to a midpoint along a length of the sleeve, the length parallel with a central axis of rotation of the fastener, and a second section extending from the midpoint to the second end of the sleeve, and wherein the midpoint is located between the first opening of the first part and the second opening of the second part of the composite casing. In a sixth example of the system, optionally including one or more or each of the first through fifth examples, the bolt has a flanged head with a diameter larger than each of an outer diameter of the sleeve and diameters of the corresponding openings of the first and second parts of the composite casing. In a seventh example of the system, optionally including one or more or each of the first through sixth examples, the flanged head of the bolt abuts each of the second end of the sleeve and an outer surface of the second part of the composite casing when threads of the bolt are engaged with the threading of the sleeve. In a eighth example of the system, optionally including one or more or each of the first through seventh examples, an outer surface of the sleeve is textured to increase friction between the outer surface of the sleeve and inner surfaces of the corresponding openings of the first part and the second part of the composite casing. In a ninth example of the system, optionally including one or more or each of the first through eighth examples, the fastener is one of one or more fasteners of like configuration and wherein the first part of the composite casing is secured to the second part of the composite casing by the one or more fasteners arranged around a perimeter of the composite casing.

The disclosure also provides support for a method for assembling a battery enclosure, the method comprising: installing a sleeve of a fastener at an opening of a first part of a composite casing, coupling a second part of the composite casing to the first part using the sleeve as a positioning guide, and inserting a bolt of the fastener into the sleeve and engaging threading of the bolt with threading of an integrated nut of the sleeve to tighten the bolt and compress the composite casing between a flanged head of the bolt and a lip of the sleeve, wherein tightening the bolt includes controlling an amount of compression applied to the composite casing by the fastener at an integrated torque limiter of the sleeve of the fastener. In a first example of the method, controlling the amount of compression at the integrated torque limiter includes one or more of deformation and shearing at the sleeve of the fastener when a torque applied to the bolt exceeds a threshold torque.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A battery enclosure, comprising:
a composite casing having a first part and a second part, the composite casing configured to enclose a battery when the first part and the second part are coupled; and
a fastener arranged in corresponding openings of the first part and the second part of the composite casing, the fastener having a sleeve shaped as a dowel pin and formed as a single, continuous unit;
wherein the sleeve includes threading to engage with a bolt at a first end of the sleeve and a torque limiter to control an amount of compressive force applied to the composite casing by the fastener, and wherein the torque limiter divides the sleeve into a first section and a second section, which are continuous with one another;
wherein the corresponding openings of the first part and the second part of the composite casing includes a first opening arranged in a first protrusion of the first part and further includes a second opening and a third opening, the second and third openings arranged in a second protrusion of the second part, and wherein the first, second, and third openings are aligned along a vertical axis of the composite casing when the first part and the second part are coupled;
wherein the sleeve of the fastener extends from the first opening to the third opening, and wherein a fit between the sleeve and the corresponding openings of the first and second parts of the composite casing is tighter at one or more of the second and third openings than at the first opening;
wherein the fastener is arranged in the corresponding openings with the first end of the sleeve inserted through the first opening of the corresponding openings and a second end of the sleeve, opposite to the first end, inserted through the third opening of the corresponding openings; and
wherein the torque limiter divides the sleeve into the first section extending from the first end of the sleeve to a midpoint of the sleeve along a length of the sleeve, the length parallel with a central axis of rotation of the fastener, and the second section extending from the midpoint to the second end of the sleeve, and wherein the midpoint is located between the first opening of the first part and the second opening of the second part of the composite casing.

2. A battery enclosure, comprising:
a composite casing having a first part and a second part, the composite casing configured to enclose a battery when the first part and the second part are coupled; and
a fastener arranged in corresponding openings of the first part and the second part of the composite casing, the fastener having a sleeve shaped as a dowel pin and formed as a single, continuous unit;
wherein the sleeve includes threading to engage with a bolt at a first end of the sleeve and a torque limiter to control an amount of compressive force applied to the composite casing by the fastener, and wherein the torque limiter divides the sleeve into a first section and a second section, which are continuous with one another;
wherein the corresponding openings of the first part and the second part of the composite casing includes a first opening arranged in a first protrusion of the first part and further includes a second opening and a third opening, the second and third openings arranged in a second protrusion of the second part, and wherein the first, second, and third openings are aligned along a vertical axis of the composite casing when the first part and the second part are coupled;
wherein the sleeve of the fastener extends from the first opening to the third opening, and wherein a fit between the sleeve and the corresponding openings of the first and second parts of the composite casing is tighter at one or more of the second and third openings than at the first opening;
wherein the fastener is arranged in the corresponding openings with the first end of the sleeve inserted through the first opening of the corresponding openings and a second end of the sleeve, opposite to the first end, inserted through the third opening of the corresponding openings;
wherein the bolt has a flanged head with a diameter larger than each of an outer diameter of the sleeve and diameters of the corresponding openings of the first and second parts of the composite casing; and wherein the flanged head of the bolt abuts each of the second end of the sleeve and an outer surface of the second part of the composite casing when threads of the bolt are engaged with the threading of the sleeve.

3. A battery enclosure, comprising:
a composite casing having a first part and a second part, the composite casing configured to enclose a battery when the first part and the second part are coupled; and
a fastener arranged in corresponding openings of the first part and the second part of the composite casing, the fastener having a sleeve shaped as a dowel pin and formed as a single, continuous unit;
wherein the sleeve includes threading to engage with a bolt at a first end of the sleeve and a torque limiter to control an amount of compressive force applied to the composite casing by the fastener;
wherein the corresponding openings of the first part and the second part of the composite casing includes a first opening arranged in a first protrusion of the first part and further includes a second opening and a third opening, the second and third openings arranged in a second protrusion of the second part, and wherein the first, second, and third openings are aligned along a vertical axis of the composite casing when the first part and the second part are coupled;
wherein the sleeve of the fastener extends from the first opening to the third opening, and wherein a fit between the sleeve and the corresponding openings of the first and second parts of the composite casing is tighter at one or more of the second and third openings than at the first opening;
wherein the fastener is arranged in the corresponding openings with the first end of the sleeve inserted through the first opening of the corresponding openings and a second end of the sleeve, opposite to the first end, inserted through the third opening of the corresponding openings; and
wherein the torque limiter divides the sleeve into a first section extending from the first end of the sleeve to a midpoint of the sleeve along a length of the sleeve, the length parallel with a central axis of rotation of the fastener, and a second section extending from the midpoint to the second end of the sleeve, and wherein the midpoint is located between the first opening of the first part and the second opening of the second part of the composite casing.

4. A battery enclosure, comprising:
a composite casing having a first part and a second part, the composite casing configured to enclose a battery when the first part and the second part are coupled; and
a fastener arranged in corresponding openings of the first part and the second part of the composite casing, the fastener having a sleeve shaped as a dowel pin and formed as a single, continuous unit;
wherein the sleeve includes threading to engage with a bolt at a first end of the sleeve and a torque limiter to control an amount of compressive force applied to the composite casing by the fastener;
wherein the corresponding openings of the first part and the second part of the composite casing includes a first opening arranged in a first protrusion of the first part and further includes a second opening and a third opening, the second and third openings arranged in a second protrusion of the second part, and wherein the first, second, and third openings are aligned along a vertical axis of the composite casing when the first part and the second part are coupled;
wherein the sleeve of the fastener extends from the first opening to the third opening, and wherein a fit between the sleeve and the corresponding openings of the first and second parts of the composite casing is tighter at one or more of the second and third openings than at the first opening;
wherein the fastener is arranged in the corresponding openings with the first end of the sleeve inserted through the first opening of the corresponding openings and a second end of the sleeve, opposite to the first end, inserted through the third opening of the corresponding openings;
wherein the bolt has a flanged head with a diameter larger than each of an outer diameter of the sleeve and diameters of the corresponding openings of the first and second parts of the composite casing; and
wherein the flanged head of the bolt abuts each of the second end of the sleeve and an outer surface of the second part of the composite casing when threads of the bolt are engaged with the threading of the sleeve.

* * * * *